United States Patent [19]

Lundh

[11] Patent Number: 4,821,263
[45] Date of Patent: Apr. 11, 1989

[54] METHOD AND APPARATUS FOR TRANSMITTING INFORMATION VIA A BUS SYSTEM

[75] Inventor: Peter C. B. Lundh, Skärholmen, Sweden

[73] Assignee: Telefonaktiebolaget L M Ericsson, Stockholm, Sweden

[21] Appl. No.: 160,255

[22] Filed: Feb. 25, 1988

[30] Foreign Application Priority Data

Feb. 27, 1987 [SE] Sweden .................. 8700840

[51] Int. Cl.⁴ ........................... H04L 11/16
[52] U.S. Cl. ........................ 370/85; 370/94; 370/110.1
[58] Field of Search ............ 370/85, 88, 89, 94, 370/95, 110.1; 340/825.03, 825.5

[56] References Cited

U.S. PATENT DOCUMENTS

| | | | |
|---|---|---|---|
| 4,426,697 | 1/1984 | Petersen et al. | 370/85 |
| 4,580,261 | 4/1986 | Pelotte | 370/85 |
| 4,652,873 | 3/1987 | Dolsen et al. | 370/85 |
| 4,755,990 | 7/1988 | Bohler et al. | 370/85 |

FOREIGN PATENT DOCUMENTS

0004376 3/1979 European Pat. Off. .

Primary Examiner—Douglas W. Olms
Assistant Examiner—Melvin Marcelo
Attorney, Agent, or Firm—Burns, Doane, Swecker & Mathis

[57] ABSTRACT

A method and apparatus for transmitting message information between a plurality of transmission units includes a plurality of data transmission channels on a bus system which are each permanently assigned to a respective transmission unit and adapted to transmit message information only to the transmission unit to which it is assigned from any one of the other transmisstion units. In addition, a plurality of status transmission channels on the bus system are each assigned to one of the transmission units and adapted to transmit status information from any one of the transmission units. This status information indicates whether the data transmission channel assigned to the same transmission unit as the respective status transmission channel is engaged or unoccupied for transmitting message information. The method and apparatus are particularly suited for switching nodes in packet-switched communications.

21 Claims, 6 Drawing Sheets

Fig 3a: | WT | D0 | D1 | D2 | D3 | D4 | D5 | D6 | D7 | D8 | D9 | D10 | D11 | D12 | D13 | D14 | D15 | X | Y | P |
positions 0–19

Fig 3b: | WT | C | AT | A0 | A1 | A2 | A3 | A4 | A5 | A6 | A7 | A8 | A9 | A10 | A11 | A12 | A13 | X | Y | P |
positions 0–19

Fig 3c: | WT | D0 | D1 | D2 | D3 | D4 | D5 | D6 | D7 | D8 | D9 | D10 | D11 | D12 | D13 | D14 | D15 | R | B | P |
positions 0–19

Fig 3d: | WT | C | AT | A0 | A1 | A2 | A3 | A4 | A5 | A6 | A7 | A8 | A9 | A10 | A11 | A12 | A13 | R | B | P |
positions 0–19

METHOD AND APPARATUS FOR TRANSMITTING INFORMATION VIA A BUS SYSTEM

TECHNICAL FIELD OF THE INVENTION

The present invention relates to a method and apparatus for transmitting information in a telecommunication network by means of a bus system having at least one bus. The method is primarily directed to the transmission of packet-switched data, and the apparatus is particularly suited to be a part of a transit node for packet-switched communications. However, it will be appreciated that a method and apparatus in accordance with the invention can be utilized to advantage in other connections also.

Many switching nodes of different kinds have been proposed for transmitting packet-switched data. For example, German Offenlegungschrift No. 2736858 discloses a switching node for transmitting packet-switched data to and from a plurality of lines. This node includes line units connected to the lines, a selector, and links for transmitting packet-switched data between the selector and the line units. It also includes central processors for traffic control, operation and maintenance. Each line unit includes a communication processor to translate the incoming data flow for the respective line and a buffer for the data packets. The type of selector that is used is not disclosed in this publication, nor is it exactly clear how communications for packet-switched data through the selector are connected and disconnected. On the other hand, the publication does disclose the work distribution between the central processor and the line unit processors in conjunction with the establishment of a new connection for packet-switched data through the selector and the transmission of packet-switched data after the communication has been established.

A switching node for transmitting packet-switched data to and from a plurality of external lines is also described in the article "Axe for Packet Switching Integration" by Matts Noren and Carl-Gunnar Perntz. The switching node described in the article has a plurality of link handling modules with a link handling unit for each of the external links, an exchange, internal links for transmitting packet-switched data between the link handling modules and the exchange, regional processors and a central processor. The establishment of communications for packet-switched data through the exchange takes place with the aid of the central processor, subsequent to which packet-switched data is transmitted over established communication lines with the aid of the link handling units. It is not disclosed in the article how the exchange is designed and exactly how established communications through the exchange for the packet-switched data are connected and disconnected. On the other hand, the article does state that the selector is based on "fast circuit switching" and that the link handling units establish communication for each packet that is transmitted.

It is well known to use buses for transmitting information, e.g., between different units in a computer. It is also well known to use buses for transmitting information within telephone exchanges, e.g., between different computers for control and maintenance of a telephone exchange.

In known methods and apparatus for transmitting information via a bus system using a plurality of other transmission means for sending and receiving information on the bus system, most of the information transmission channels on the bus system are not generally reserved for transmission to or from some given one of the transmission means. At least most of the information transmission channels are generally usable for transmitting information from any one of a plurality of transmission means to any one of a plurality of other transmission means. The different means have to compete for the information channels according to some given system, and the means can be given different priorities. Without doubt such known methods and apparatus can have certain advantages in certain respects in the transmission of information in certain connections. For example, the information channels available on the bus system can be utilized relatively effectively, particularly when a transmission means can send information on several of the information channels more or less simultaneously in a time multiplexed fashion, and when each transmission means can receive information on several of the information channels more or less simultaneously in the same fashion. However, systems which operate in this manner require either a common special channel assigning means with channel assigning equipment for assigning differen information channels to the transmission means from time to time, or corresponding separate channel assigning equipment in several of the transmission means for finding different unoccupied information channels from time to time. Such common channel assigning means and equipment tend to be relatively complicated and expensive, particularly with more sophisticated bus systems that provide effective utilization of the information channels. In addition, the time for finding an unoccupied information transmission channel on the bus system and connecting such a located information transmission channel, so that it is ready for transmission of information from a sending transmission means to a receiving means, tends to be relatively long, at least in relation to the information transmission rate on the transmission channel. The relatively long time and the relatively complicated and expensive equipment required to find and connect an unoccupied information transmission channel in such cases can be a problem in certain methods and apparatus for information transmission on certain bus systems. The invention aims to solve this problem, particularly in switching nodes for transmitting packet-switched messages on packet-switched communications through the switching node.

Statement of the Invention

One object of the present invention is to provide a method and apparatus for transmitting messages via a bus system with a plurality of information transmission channels and a plurality of transmission means for sending and receiving information on the bus system, where the time required to connect an unoccupied information transmission channel is short in relation to the transmission rate on the information transmission channel.

Another object of the invention is to achieve a method and apparatus for transmitting messages via a bus system with a plurality of information transmission channels and a plurality of transmission means for sending and receiving information on the bus system, where the connection of an unoccupied information transmission channel to the bus system between two transmission means can be carried out according to a relatively simple procedure with relatively simple and inexpensive equipment.

A further object of the invention is to achieve a method and apparatus for transmitting message information via a bus system with a plurality of information transmission channels and a plurality of transmission means for sending and receiving information on the bus system, which does not require any particular channel assigning means with channel assigning equipment for assigning different information channels to different transmission means from one occasion to the next. To this end, the transmission means which is to send the information is able, by itself, to connect an unoccupied information transmission channel to the transmission means which is to receive information from the sending transmission means.

A still further object of the present invention is to achieve a method and a switching node for rapid transmission of packet-switched messages via a bus system with a plurality of information transmission channels and a plurality of transmission means for sending and receiving message information on the information transmission channels of the bus system.

Briefly stated, a method and apparatus in accordance with the invention is based on a given fixed assignment of the information transmission channels of the bus system to the different means, special status transmission channels being used for indicating whether specified data transmission channels are in an unoccupied or engaged state.

In a method in accordance with the invention, a plurality of data transmission channels on the bus system are permanently assigned, each to one of the transmission means, and adapted for transmitting, in appropriate cases, message information solely to its assigned transmission means from a selectable one of the transmission means. Furthermore, a plurality of status transmission channels on the bus system are permanently assigned, each to one of the transmission means and its corresponding data transmission channel. From a selectable one of the transmission means to other transmission means, each such permanently assigned status transmission channel is adapted to transmit status information to indicate whether the data transmission channel, which is permanently assigned to the same transmission means at the respective status transmission channel, is engaged. An apparatus in accordance with the invention includes a plurality of transmission means and a bus system with transmission channels arranged in a corresponding manner.

In a preferred embodiment of a method and apparatus in accordance with the invention, message information is transmitted from each transmission means on the bus system data transmission channels to at most one transmission means at a time.

In a further preferred embodiment of a method and apparatus in accordance with the invention, messages from at most one transmission means at a time are transmitted to each transmission means on the bus system data transmission channels.

In a preferred embodiment of a method and switching node in accordance with the present invention for transmitting message information on packet-switched communications, each transmission means is supplied with the message information from at most one packet-switched connection at a time for transmission over the bus system data transmission channels. It is particularly preferable that each transmission means on the bus system data transmission channels receives the message information coming from at most one packet-switched communication at a time.

A method and apparatus for transmitting message information in accordance with the invention, particularly according to preferred embodiments thereof, provides several advantages, of which at least certain advantages with certain embodiments will be particularly salient in transferring message information on packet-switched communications.

One advantage is that the procedure for finding, in appropriate cases, an unoccupied information transmission channel for a given transmission will be simple. Another advantage is that the procedure, in appropriate cases, for finding and connecting to an unoccupied information channel for a given information transmission operation can be made relatively quickly in relation to the information transmission rate of the information channel. A further advantage is that common particular channel assignment means with channel assignment equipment for supervising and assigning information transmission channels to different transmission means from one time to another are not required. With its own simple and inexpensive equipment each transmission means can itself rapidly connect to an unoccupied information transmission channel on the bus system in appropriate cases.

Certain special advantages can be achieved in a switching node for packet-switched communication with a preferred embodiment of a method and apparatus in accordance with the invention. A telephone exchange including a bus system and transmission means for sending and receiving information does not need its own processor for controlling the individual connections and disconnections of the data transmission channels in conjunction with transmission of message information on packet-switched communications. The individual connections and disconnections can be made without a processor by the respective transmission means in the exchange, in accordance with commands which are transmitted on the packet-switched communications. In this manner a plurality of processors which are not associated with the exchange itself, but are each connected to one of the transmission means via its own internal link, can effect connection of data transmission channels on the bus system from the transmission means they are connected to.

Further advantages of a method and apparatus in accordance with the invention, and in particular with preferred embodiments, will be understood by one skilled in the art upon review of the following description of preferred embodiments of the invention.

DESCRIPTION OF THE ILLUSTRATED EMBODIMENTS

Figure 1:
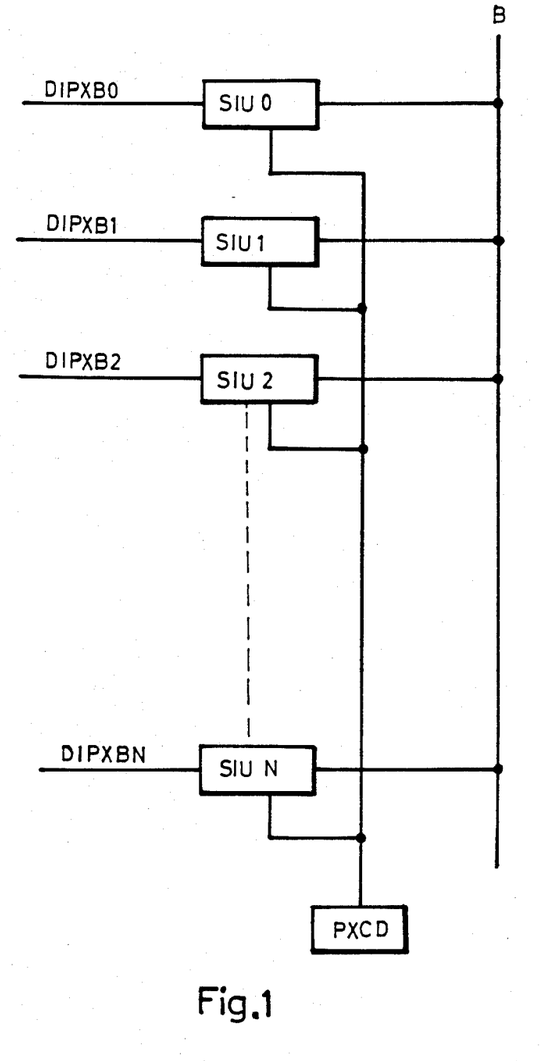
FIG. 1 illustrates, in a simplified block form a first embodiment of an apparatus in accordance with the invention.

Referring to the drawings, FIG. 1 represents a simplified illustration of a first embodiment of an apparatus in accordance with the invention for transmitting message information between a plurality of internal links DIPXB0, DIPXB1, . . . , DIPXBN. The apparatus includes a plurality of transmission or communication means SIU0, SIU1 . . . , SIUN, a bus system B and a time control unit PXCD. All the transmission means are connected to the bus system and the time control unit, as well as to a respective one of the internal links.

The transmission means and bus system are formed such that the bus system comprises a plurality of data transmission channels, each of which is assigned to a respective transmission means. Each such channel is adapted to transmit message information only to the transmission means to which it is assigned. Message information can be transmitted on such a channel to the transmission means to which it is assigned from any one of the other transmission means at a time. Message information to a given transmission means is always transmitted on the bus system on the same data transmission channel, irrespective of the particular transmission means from which the transmission originates.

The bus system also comprises a plurality of status transmission channels which are each assigned to one of the transmission means. Each such channel is adapted to transmit status information indicating whether the data transmission channel, which is permanently assigned to the same transmission means, is engaged or unoccupied for the transmission of message information. Status information can be transmitted on each status transmission channel from any transmission means, although from only one means at a time. However, this status information can be transmitted on each such channel to any one of the other transmission means, and even to several transmission means simultaneously. Status information indicating whether a given transmission channel assigned to a given transmission means is engaged or unoccupied is thus always transmitted on the bus system on a given status transmission channel irrespective of the transmission means from which it originates and irrespective of those transmission means to which the status information is transmitted.

The transmission of message information on the data transmission channels between the transmission means is synchronized with bit and word synchronizing signals from the time control unit PXCD. This unit also generates time allocation signals that allocate each transmission means a unique time slot in a cyclic, time-related order. Only during its unique time slot can each transmission means begin or terminate the generation of status information indicating that a data transmission channel is engaged. On the other hand, each transmission means can maintain a previously initiated transmission of status information during its allocated unique time slot as well as before and after such a time slot. Allocation of the unique time slots takes place independently of the transmission on the data transmission channels and in a time-related cyclic order. The time slots of a given transmission means are thus not dependent on whether the transmission means participates in any transmission as a sending or receiving transmission means.

Each transmission means SIU is capable of transmitting message information, via the bus system, from its internal link DIPXB to at most one other transmission means at a time. Each means also receives message information intended for its internal link, via the bus system, from at most one other transmission means at a time. Each means is further able to simultaneously receive, on its assigned data transmission channel, message information as it sends message information on any other data transmission channel.

The bus system and transmission means are thus arranged so that the transmission of message information from a first transmission means to a second transmission means on a data transmission channel assigned to the second means does not obstruct the transmission of message information from a transmission means, other than the first one, to a transmission means other than the second one on any data transmission channel assigned to a transmission means other than the second one. With an apparatus as shown in FIG. 1, which has $N+1$ transmission means SIU and $N+1$ data transmission channels, each assigned to a respective transmission means, and $N+1$ status transmission channels, each assigned to a respective transmission means, up to $N+1$ transmissions of message information between the internal links can therefore take place simultaneously without mutual obstruction. However, the transmission of message information from each internal link can take place to at most one other internal link at a time. Furthermore, the transmission of message information to each internal link can take place from at most one other internal link at a time.

The transmission of message information between two transmission links in a system as shown in FIG. 1 proceeds substantially as follows. A first transmission means connected to a first link receives from this link destination information indicating that message information is desired to be transmitted to a second link. The first transmission means senses the status information on the status transmission channel that is assigned to the transmission means of the second link. With the aid of the sensed status information, the first link's transmission means determines whether the data transmission channel which is assigned to the second link's transmission means is engaged or unoccupied. If the data transmission channel which is assigned to the second link's transmission means is engaged, the first link's transmission means delays the desired transmission of message information. If the data transmission channel which is assigned to the second link's transmission means is unoccupied during a time slot allocated to the first link's transmission means, the latter begins to send status information. This status information is sent on the status transmission channel which is assigned to the second link's transmission means. This information indicates that the data transmission channel which is assigned to the second link's transmission means is engaged. The desired transmission of message information from the first link to the second link then takes place via the first link's transmission means and the data transmission channel on the bus system which is assigned to the second link's transmission means.

During this transmission of message information, the first link's transmission means continues to send status information on the status transmission channel which is assigned to the second link's transmission means. The status information indicates that the data transmission channel which is assigned to the second link's transmission means is engaged. Remaining transmission means are thus prevented from sending message information on the data transmission channel which is assigned to the second link's transmission means. After the desired message information transmission from the first link to the second link has been completed, the first link's transmission means ceases to send the status information on the status transmission channel during the next subsequent time slot allocated to the first link's transmission means. By sensing the status information on the status information transmission channel of the second link's transmission means, the remaining transmission means can discover, as required, that the data transmission channel which is assigned to the second link's transmission means has once again become unoccupied. One of the remaining transmission means can then begin to send, as required, status information on the status transmission channel of the second link's transmission means.

Each transmission means can individually find an unoccupied data transmission channel and utilize, on the basis of received destination information, the assigned data and status transmission channels on the bus system B and the allocation of time slots as synchronized by the time control unit PXCD, according to the method described above. Thus, there is no requirement for any intelligent channel allocation means common to the transmission means to allocate, from case to case, different unoccupied data transmission channels on the bus system to the various transmission means. The transmission of message information through an apparatus as illustrated in FIG. 1 can thus be readily controlled simultaneously from a plurality of units, each connected to its respective one of the internal links. These units are mutually and independently able to control at least the sensing of the status information on the status transmission channels. With separate status transmission channels in accordance with the above, the sensing of status information can take place particularly simply and quickly. In addition, the transmission means are able to mutually and independently sense the status information on any one of the status transmission channels and notify the unit connected to its internal link if a corresponding data transmission channel is engaged or unoccupied. Very short times can thus be obtained in the operation of the apparatus according to FIG. 1 to establish a communication from one unit to another via an unoccupied data transmission channel on the bus system.

Figure 2:
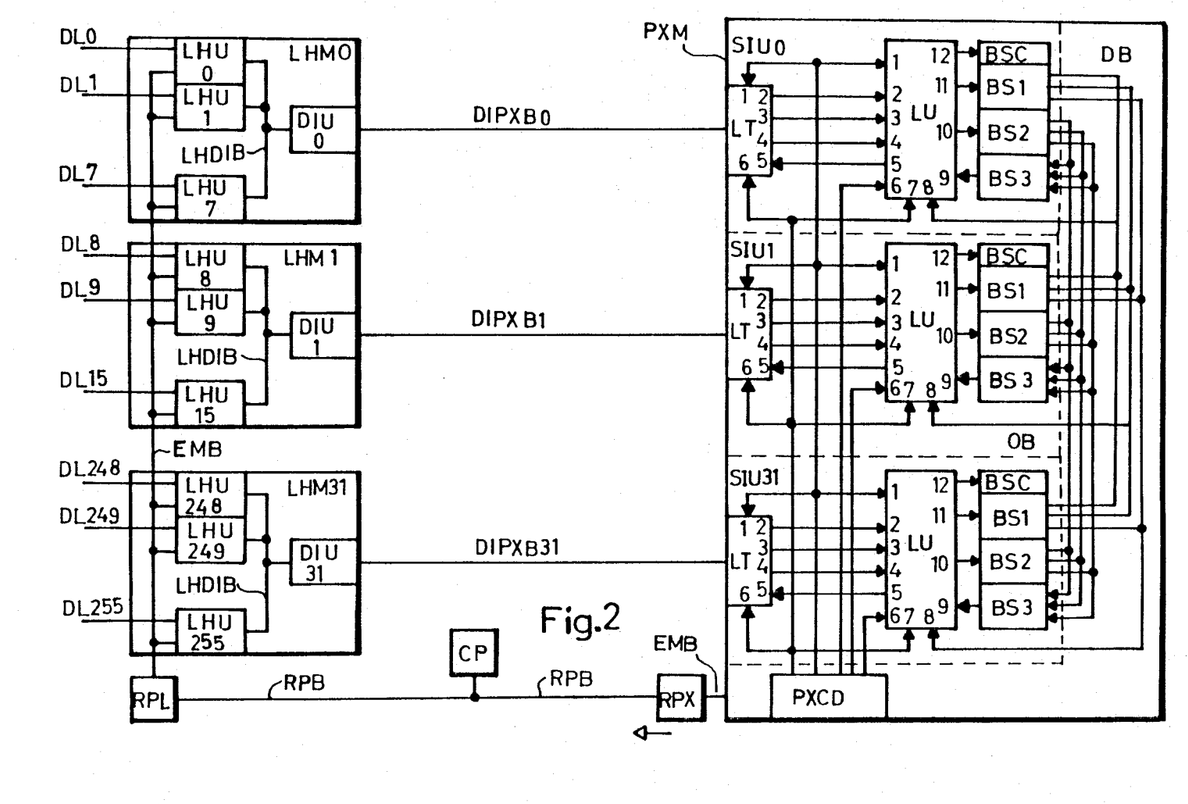
FIG. 2 illustrates, also in a simplified block form, a switching node in accordance with the invention for packet-switched communications.

An information transmitting apparatus of the type shown in FIG. 1 and described above can be used with different peripheral equipment for transmitting digital information in different connections. FIG. 2 illustrates, in block diagram form, a switching node in accordance with the invention for transmitting packet-switched information between a plurality of external links DL. The switching node includes a plurality of internal links DIPXB and an exchange PXM, the latter functioning substantially in the manner of the apparatus of FIG. 1 to transmit information between the internal links.

The exchange PXM includes a transmission means SIU for each internal link, a bus system with a data bus DB and a status bus OB, these buses each having a conductor for each transmission means, as well as a time control unit PXCD. The exchange is connected via a processor bus EMB to a regional processor RPX for supervision and maintenance. The regional processor RPX is in turn connected to the switching node central processor CP via a processor bus RPB.

Each transmission means SIU includes a link connection unit LT, three bus selectors BS1-3 with a common bus selector control BSC and a logic unit LU. Each transmission means is connected by its link connection unit to one of the internal links. Each link connection unit includes reception circuits for receiving information serially from the internal link. Each link connection unit has output terminals 2, 3 and 4 coupled, respectively, to input terminals 2, 3 and 4 of the logic unit in the same transmission means for transmitting bit clock pulses BCLX, word clock pulses WCLX and information SDLX from the internal link to the logic unit. Each link connection unit also includes transmission circuits for serially transmitting information from the transmission means on the internal link. Each link connection unit has an input terminal 5 connected to an output terminal 5 on the logic unit in the same transmission means for receiving information SDLX which is to be sent out on the internal link. Transmission of this information takes place at a rate determined by the time control unit. Each link connection unit therefore has an input terminal 1 for bit clock pulses BCXL and an input terminal 6 for word clock pulses WCXL connected to corresponding output terminals of the time control unit PXCD.

The logic unit LU of each transmission means has, like the link connection unit, an input terminal 1 for bit clock pulses BCXL and an input terminal 7 for word clock pulses WCXL connected to output terminals on the time control unit. In addition, the logic unit has an input terminal 6 connected to its own output terminal on the time control unit for unique time allocation signals PN. The logic unit further has an input terminal 8 connected to a unique conductor in the data bus DB, this conductor being permanently assigned to its respective transmission means. The input terminals 8 of different logic units are thus connected to their respective conductors in the data bus.

The logic unit has an input terminal 9 connected to an output terminal on the third bus selector BS3, an output terminal 10 connected to an input terminal on the second bus selector BS2, an output terminal 11 connected to an input terminal on the first bus selector BSI and an output terminal 12 connected to an input terminal on the bus selector control BSC.

The first bus selector BSI is connected to all conductors in the data bus DB and sends message information from the logic unit output terminal 11 to a conductor in the data bus determined by the bus selector control BSC.

The second bus selector BS2 is connected to all the conductors in the status bus OB and sends status information from the logic unit output terminal 10 to a conductor in the status bus determined by the bus selector control BSC.

The third bus selector BS3 is connected to all the conductors in the status bus OB and functions to provide status information to the logic unit input terminal 9 from a conductor in the status bus determined by the bus selector control.

The bus selector control of each transmission means controls all three bus selectors in the same transmission means synchronously in response to information from the logic unit output terminal 12. When the first bus selector is set to provide information to a first one of the conductors in the data bus DB, both the second and the third bus selectors are therefore set to send or receive status information on the corresponding first conductor in the status bus. When the first bus selector is set to a second one of the conductors in the data bus, both the second and third bus selectors are set to the second conductor in the status bus. The corresponding operation applies when the first bus selector is set to any other conductor in the data bus.

In the exchange, each transmission means SIU is adapted to individually, and in cooperation with remaining transmission means, transfer information on the bus system substantially in the manner that has been described in connection with the transmission apparatus of FIG. 1.

The message information which is to be transmitted over the exchange bus system is provided to the switching node on one or more of a plurality of external links DL0, DL1, . . . DL255. After transmission within the switching node, the message information is to be sent from the node on one or more of the external links DL. On the latter, transmission of the packet-switched message information towards and away from the switching node preferably takes place according to the protocol X75.

The switching node in FIG. 2 includes a plurality of link handling units LHU0, LHU1, . . . LHU255, each connected to its respective external link DL0, DL1, . . . DL255. Each link handling unit includes a transmitter, a receiver, a memory, a main processor, a slave processor and other devices for receiving, storing and sending packet-switched message information, to thereby handle the levels 1, 2 and 3 in the protocol X75.

All link handling units are connected via a processor bus EMB to a regional processor RPL. The latter is also connected to the switching node central processor CP via a processor bus RPB.

The link handling units LHU are arranged in groups which form handling magazines LHM. In each such magazine the units LHU are connected to a distribution unit DIU via a distribution bus LHDIB. Each distribution unit is also connected to a respective transmission means SIU in the exchange PXM in the switching node, by means of an internal link DIPXB. The number of transmission means SIU in the exchange therefore corresponds to the number of internal links DIPXB and the number of link handling magazines LHM. However, it is preferable that the transmission means SIU, the internal links and the distribution units DIU be duplicated and conventionally arranged in two planes for reasons of operational reliability.

The switching node in FIG. 2 is of a type intended to accommodate, at most, 256 external X75 links and has eight link handling units LHU per link handling magazine LHM. The number of internal links DIPXB and the number of transmission means SIU in one plane is thus a maximum of 32. For reasons of space, only one plane of the switching node is illustrated in FIG. 2 with only three of the link handling magazines, namely LHM0, LHM1, and LHM31, each with only three of the link handling units. For the same reasons, only three of the internal links are illustrated, namely DIPXB0, DIPXB1 and DIPXB31, and only three of the transmission means in the exchange, namely SIU0, SIU1 and SIU31.

Each link handling unit LHU is designed to accommodate packet-switched information intended for only one other link handling unit at a time. Each such unit is also designed to receive packet-switched information from only one other link handling unit at a time. Accordingly, each link handling unit can transmit packet-switched information to a link handling unit simultaneously with the reception of packet-switched information from the same or some other link handling unit.

Each internal link DIPXB connected to a link handling magazine LHM is designed to transmit packet-switched information to its transmission means SIU from only one link handling unit in the magazine at a time. Each distribution unit SIU between an internal link and a group of link handling units in a magazine is therefore adapted to allow only one link handling unit LHU at a time to send information to the respective transmission means SIU in the exchange. Each internal link DIPXB is also designed to transmit packet-switched information from its transmission means SIU in the exchange to only one link handling unit at a time in its magazine. Packet-switched information can take place simultaneously in both directions on each internal link DIPXB, i.e., transmission of packet-switched information from a link handling unit in the link magazine LHM can take place simultaneously with the transmission of packet-switched information to a link handling unit in the same link's magazine LHM. The transmission rate on an internal link is high, e.g., 8 Mb/s, compared with the transmission rate on an external link, e.g., 64 Kb/s.

Figure 3A:
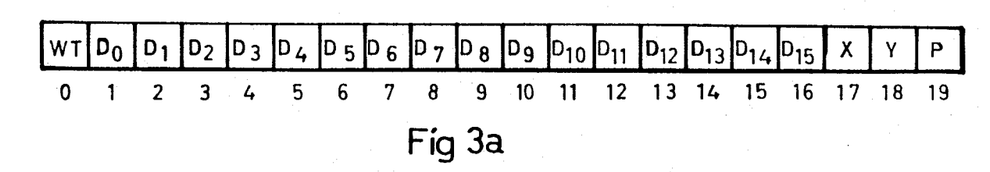
FIGS. 3a–3d illustrate the format of words transmitted in a switching node of the type shown in FIG. 2.
Figure 3B:
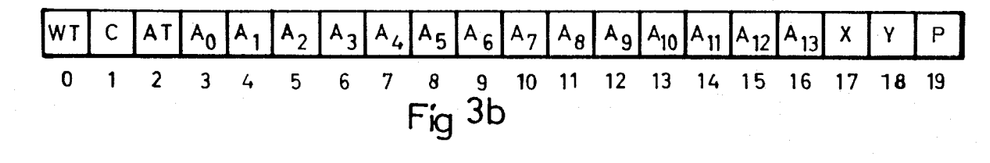
Figure 3C:
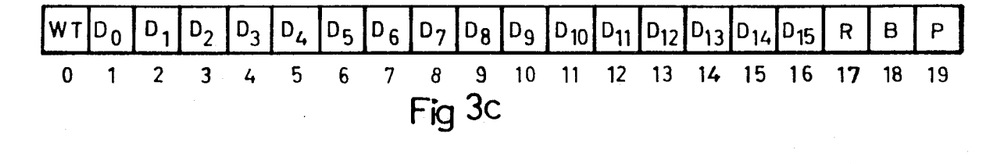
Figure 3D:
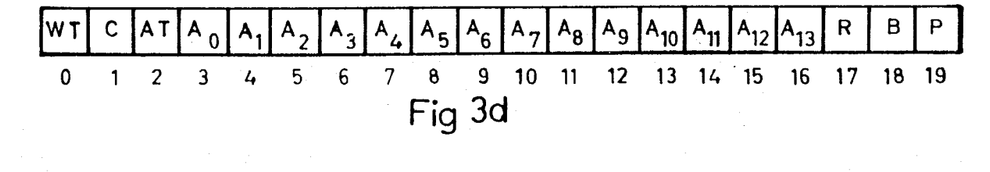

Different kinds of words with formats as shown in FIGS. 3a–3b can be constantly transmitted on each internal link DIPXB between a transmission means and a group of link handling units in a magazine LHM. Data words as shown in FIG. 3a or control words as shown in FIG. 3b can be transmitted on an internal link DIPXB in the direction from a group of link handling units to a transmission means SIU in the exchange. Data words as shown in FIG. 3c or control words as shown in FIG. 3d can be transmitted on an internal link in the direction from a transmission means SIU in the exchange to a group of link handling units.

All the words of the formats shown in FIGS. 3a–3d include 20 bits numbered 0 to 19. The symbols in one word are transmitted on the respective internal link in series and in order with bit 0 being first and bit 19 being last in the respective word In all words the bit 0 is a word type bit, WT, which is used to denote whether the word is a data word or a control word. The word type bit is set to 0 for data words and to 1 for control words by the respective link handling unit or its transmission means.

Bit 1 up to and including bit 16 are data bits, D0, D1, . . . D15, in data words of the type shown in FIG. 3a, which go from a link handling unit to a transmission means in the exchange, and these data bits can be utilized to transmit packet-switched message information through the exchange. If there is no message information to be transmitted, the respective distribution unit sends data words with D0–D15 set to 0. Bits 17 and 18 in data words transmitted on an internal link to a transmission means in the exchange are filling-out or spacing bits, X and Y, which are not utilized for the transmission of information and have their logic value set to 0 by the link handling unit and distribution unit when no message information is to be sent. Bit 19 is a parity bit P, whose logic value is set during transmission by the link handling unit or the distribution unit so that the sum of the logic values of all bits in the data word will be odd.

In control words of the type shown in FIG. 3b, which travel from a link handling unit to a transmission means in the exchange, Bit 1 is a switching bit C whose logic value denotes whether the transmitting link handling unit desires to have a communication connected or disconnected. When the establishment of a connection is desired, the link handling unit sets the value of the switching bit C to 1. When a disconnection is desired the link handling unit sets the value of the switching bit C to 0. Bit 2 is an address type bit AT, and bit 3 up to and including bit 16 are address bits, A0, A1, ... A13. The logic value of the address type bit denotes what type of address is being referred to by the address bits A0, A1, ... A13. When these address bits relate to an address of a link handling magazine LHM, the address type bit AT is set to 0. When they relate to an address of a link handling unit in a given magazine LHM the address type bit value is set to 1. Bit 19 is a parity bit which has its value set so that the control word is given odd parity.

In data words as shown in FIG. 3c, which go from a transmission means SIU in the exchange to a magazine with link handling units, Bit 1 up to and including bit 15 are data bits D0, D1 ... D15, and these data bits can be utilized to transmit packet-switched message information. When there is no message information to be transmitted, the transmission means sends data words with D0-D15 set to 0. Bits 17 and 18 are used for information to a link handling unit which has requested a connection to be established, and indicate whether or not the requested connection has been performed. Bit 17 is thus a "fulfilled" flagging bit R, the logic value of which is set by the communication means to 1 when the requested connection has been established. After connection, the transmission means sets the "fulfilled" flagging bit to 1. Bit 18 is an "engaged" flagging bit B, the logic value of which is set by the transmission means to 1 if the requested communication cannot be connected because the channel is already engaged. Bit 19 is a parity bit P, the logic value of which is set by the transmission means SIU in the exchange so that the data word sent out by the respective internal link is given odd parity.

In control words of the type shown in FIG. 3d, which are transmitted on an internal link from a transmission means SIU to a group of a link handling units, Bit 1 is a switching bit C the logic value of which denotes whether a connection or disconnection is desired. When the establishment of a connection is desired, the value of the switching bit C is set to 1. When disconnection is desired the value of the bit is set to 0. Bit 2 is an address type bit AT, and bit 3 up to and including bit 16 are address bits A0, A1, ... A13. The logic value of the address type bit denotes what type of address the address bits A0, A1, ... A13 relate to. When the address bits A0-A13 relate to an address to a magazine with a group of link handling units LHU the address type bit AT is set to 0. When the address bits A0-A13 relate to an address to a link handling unit in a magazine, the bit value is set to 1. Bits 17 and 18 are used in control words from a transmission means in the exchange in the same way as bits 17 and 18 are used in data words from a transmission means. As with the other words, bit 19 in control words of the type shown in FIG. 3d is a parity bit, the logic value of which is set so that the word is given odd parity.

The function of the switching node is best understood with reference to examples of operations in conjunction with the transmission of packet-switched information between external links and through the exchange. In the following description it is therefore assumed that information concerning a packet-switched communication comes in on an external link to a link handling unit LHU (hereinafter designated as "the incoming LHU"), and by way of example it can be LHU 1 connected to the external link DL1. For the sake of simplicity, information coming in on the link DL1 to the incoming LHU is assumed to be divided into a switching packet, a plurality of information packets and a disconnection packet.

When a switching packet comes in on the link DL1 to the incoming LHU, the latter transfers the information in this packet to the switching node central processor CP via the processor bus EMB and the regional processor RPL. The information from the switching packet is analyzed by the central processor, which decides to which link handling unit the subsequent information packets are to be sent from the incoming LHU. The link handling unit LHU to which the information packet is to be sent is hereinafter designated "the outgoing LHU" and can be LHU 248, for example. After analysis and decision, the central processor transmits destination information to the incoming LHU via the processor bus and regional processor RPL. This destination information indicates which link handling unit is to be outgoing LHU. The central processor also sends information via the regional processor RPL and the processor bus to the outgoing LHU to indicate whether it can expect information from the incoming LHU. Accordingly, a virtual communication for packet-switched information through the switching node has been established with the aid of the central processor. At this time, the incoming LHU and outgoing LHU have information as to whether a logic communication exists between the incoming external link DLI connected to the incoming LHU and an outgoing external link DL 248 connected to the outgoing LHU. o physical communication for the transmission of the subsequent information packets through the exchange PXM is as yet connected, however. Establishing a virtual communication through the exchange is performed on the initiative of the incoming LHU.

When the incoming LHU has received one or more information packets which are to be expedited to the outgoing LHU, the incoming LHU forms a control word with the destination information indicating the magazine LHM in which the outgoing LHU is to be found. The incoming LHU subsequently sends a request, via the distribution bus LHDIB, to the distribution unit DIUO for access to the internal link DIPXBO. When the incoming LHU is given an opportunity by the respective distribution unit DIU to send information via the internal link DIPXB0, the incoming LHU sends this control word to its transmission means SIUO in the exchange. The control word is received by the link connection unit LT of the transmission means and is transferred to the logic unit LU of the transmission means. Providing the control word and previous word have the right parity, information from the control word is sent from the logic unit to the bus selector control BSC, causing this to be set to the transmission means in the exchange to which the outgoing LHU is connected via an internal link.

This bus selector control setting causes the first and second bus selectors to be set to send information on the conductors of the data bus and the status bus which are permanently assigned to the transmission means of the outgoing LHU. The third bus selector will simultaneously be set to receive status information on the status bus conductor which is permanently assigned to the transmission means SIU 31 of the outgoing LHU.

The logic unit LU in the transmission means SIU0 is designed so that neither the first nor the second bus selector is immediately supplied with any signal which will cause them to begin sending immediately. The logic unit receives status information first via the third bus selector, this information possibly being transmitted from some other means SIU on the status bus conductor associated with the transmission means SIU 31 to which the outgoing LHU is connected. If the logic unit receives, via the third bus selector, status information indicating that the transmission means of the outgoing LHU is engaged, this signifies that a connection between the incoming LHU and outgoing LHU cannot be established for the moment. In such a case the logic unit notifies the incoming LHU of this situation by setting the "fulfilled" flagging bit R to 0 and the engaged flagging bit to 1 in words transmitted from the transmission means to the incoming LHU.

The connection can be established if the logic unit does not receive any status information, via the third bus selector, indicating that the transmission means of the outgoing LHU is engaged. In this case the logic unit supplies signals to the second bus selector BS2 so that status information is sent from this selector to indicate that the transmission means SIU 31 of the outgoing LHU is engaged. The logic unit also sends information to the incoming LHU via the internal link DIPXB0, to indicate that the connection is established. The "fulfilled" flagging bit R is then set to 1 and the "engaged" flagging bit is set to 0 by commands from the means SIU0 to the incoming LHU. By this action the data bus conductor to the transmission means of the outgoing LHU is reserved for the established connection between the incoming LHU and outgoing LHU. If some other transmission means SIU is required to transmit to the transmission means of the outgoing LHU, such an operation will be prevented by the status information sent from the transmission means SIU0 of the incoming LHU on the status bus conductor associated with the transmission means SIU 31 of the outgoing LHU.

When the incoming LHU has obtained information from its transmission means that the connection through the exchange to the outgoing LHU has been established, the incoming LHU will transmit control words and data words via its internal link DIPXB0 to its transmission means SIU0. These control and data words will be sent from the link connection unit LT of the transmission means SIU0 via he logic unit LU to the first bus selector BS1 in the same transmission means. Words from the first bus selector will be transmitted via a conductor in the data bus to the logic unit in the transmission means SIU 31, to which the outgoing LHU is connected. The words are sent from this logic unit via the link connection unit LT and internal link DIPXB 31 of the transmission means SIU 31 to the distribution unit DIU 31 for the magazine LHM 31 by link handling units with which the outgoing LHU is associated. These words are transmitted from the distribution unit DIU 31 on the distribution bus LHD1B to all the link handling units LHU in the group. At least one control word is provided with destination information, however, to indicate which link handling unit in the magazine the subsequent data words are intended for. They will therefore be ignored by all LHUs in the magazine except the outgoing LHU, and the message information from the data words are stored only in the outgoing LHU memory.

For the sake of clarity, it is to be noted that no buffer storage of those data words need actually take place in the distribution units DIU0 or DIU31, in the internal links DIPXB0 or DIPXB31 or in the bus selectors. In principle, transmission can thus take place directly from the incoming LHU to the outgoing LHU. When all data words have been transmitted, the incoming LHU sends at least one control word with a disconnection request to its transmission means SIU0, after which the logic unit in SIU0 ceases to supply the second bus selector the signals which cause the engaged information to be sent on the status bus conductor associated with the transmission means of the outgoing LHU. This transmission means SIU31 thus ceases to be engaged. Other transmission means in the exchange PXM can then discover that the status information flagging the engaged state is no longer being sent on the status bus conductor in question. As required, these other transmission means can then begin to send engagement flagging status information on this bus conductor and reserve the corresponding bus conductor in the data bus for transmission to the transmission means SIU 31 in question.

To prevent the possibility that one or more transmission means is unable to send packet-switched information to a given transmission means due to its bus conductors being engaged for a long period of time, or even continuously, the logic units LU of the transmission means can be controlled such that each logic unit can begin or terminate the transmission of "engaged" flagging status information only during a given time slot. The logic units are each allocated equal length time slots by the time allocation signals from the timing unit PXCD, so that during the first time slot only a first transmission means can begin or terminate the transmission of engaged status information during a second time slot only a second transmission means can begin or terminate sending engaged status information, and so on. On the other hand, a transmission means which has begun to send status information on a given conductor in the status bus during its time slot can, of course, continue to send the same status information on the same conductor in the status bus even after the termination of its time slot.

Figure 4:
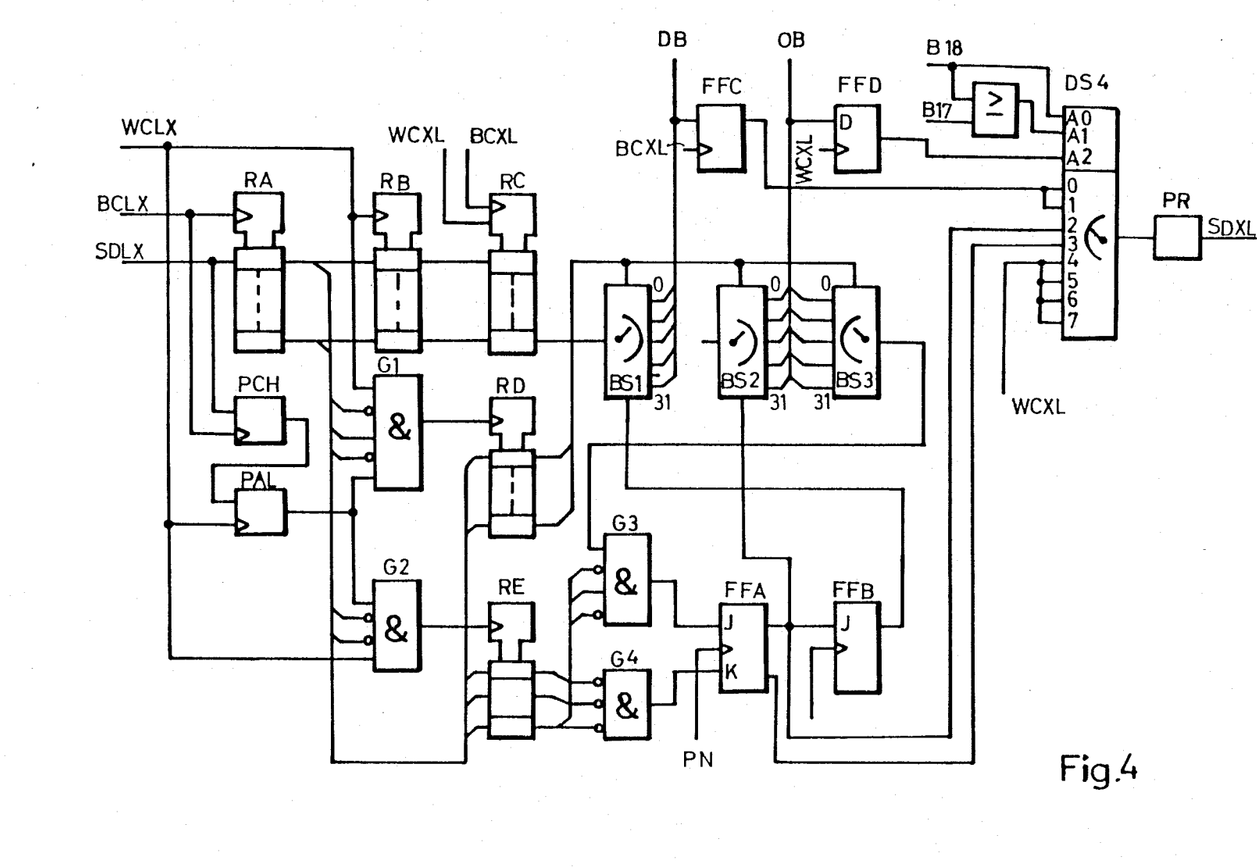
FIG. 4 illustrates a portion of an exchange in a switching node of the type shown in FIG. 2.

FIG. 4 illustrates a simplified block diagram of an embodiment of portions of a transmission means SIUN, and its connection to the data bus DB, status bus OB and time control unit PXCD in an exchange.

The transmission means SIUN receives via its link connection unit (not illustrated in FIG. 4) word clock signals WCLX, bit clock signals BCLX and binary information signals SDLX in serial form from its internal link DIPXBN. Depending on the implementation of the internal link, these word and bit clock signals can have a phase angle differing more or less from the phase angle of the corresponding word clock signals WCXL or the bit clock signals BCXL received by the transmission means from the time control unit PXCD in the exchange. The transmission means therefore has three registers RA, RB and RC for locking words received from a link handling unit via the internal link DIPXBN to the phase of the time control unit clock signals.

Each of the registers RA, RB, and RC has 20 storage positions for binary symbols. The binary information symbols from the internal link are serially fed into the first register RA at a rate determined by the bit clock signal BCLX from the link. The shift register RA has an output terminal for every storage position and these terminals are each connected to corresponding input terminals on the second register RB. The binary information in the first register is fed in parallel and word by word into the second register at a rate determined by the word clock signals WCLX from the link. The second register RB also has an output terminal for each of its storage positions, and these terminal are each connected to a respective input terminal on the third register RC. The binary information in the second register is fed in parallel and word by word into the third register RC at a rate determined by word clock signals WCXL from the time control unit PXCD. The third register RC has an output terminal connected to an input terminal on a first bus selector BS1 and serially feeds binary information to the first bus selector at a rate determined by bit clock signals BCXL from the time control unit.

The transmission means in FIG. 4 includes a parity control means PCH and a parity alarm means PAL for the information symbols SDLX from the internal link. The binary information symbols from the link are fed into the parity control means PCH at a rate determined by the bit clock signals BCLX from the link. The parity control means PCH has an output terminal connected to an input terminal of the parity alarm means PAL for the information symbols. The parity alarm means also has a clock input for receiving word clock signals WCLX from the link. The parity alarm means PAL has an output connected to an input terminal on a first AND gate G1 and an input terminal on a second AND gate G2 for transmitting a signal that denotes whether the binary information symbols in the latest received word from the internal link have the proper parity.

The first AND gate G1 furthermore has an input terminal for word clock signals WCLX from the link and three input terminals for binary information signals from the first register RA. Two of these input terminals are inverting and connected to the output terminals from the memory positions in the first register which contain bit number 0 and bit number 2 when a complete word is fed into the first register. The third input terminal is non-inverting and is connected to the output terminal from the memory position in the first register which contains bit number 1 when a complete word is fed into the first register. The first AND gate G1 has an output terminal connected to a clock input on a fourth register RD.

The second AND gate G2 also has an input terminal for word clock signals WCLX from the link and two inverting input terminals for information symbols from the first register. The inverting input terminals are connected to the output terminals from the memory positions in the first register which contain bit number 0 or bit number 2 when a complete word is fed into the first register. The second AND gate G2 has an output terminal connected to a clock input on a fifth register RE.

The fourth register RD has five storage positions, each with an input terminal and an output terminal for binary symbols. The input terminals are each connected to an individual output terminal from the storage positions in the first register RA containing bit number 3, 4, 5, 6 or 7 when a complete word is fed into the first register. The output terminals of the fourth register are connected to control inputs on each of a first bus selector BS1, a second bus selector BS2 and a third bus selector BS3. The fourth register is thus connected to the first register for receiving in parallel five binary symbols from the same word at a rate determined by the output signals from the first AND gate G1. The fourth register also provides synchronous control of the three bus selectors.

The fifth register RE has three storage positions, each with an input terminal and an output terminal for binary symbols. The input terminals of the fifth register are each connected to an individual output terminal from the storage positions in the first register RA containing bit number 0, bit number 1 and bit number 2 when a complete word is fed into the first register. The output terminals from the fourth register storage positions are each connected to individual input terminals on a third AND gate G3 and also to individual input terminals on a fourth AND gate G4. All the input terminals on the fourth AND gate are inverting, but only two of the third AND gate input terminals are inverting. The input terminals of the third AND gate are connected to the output terminals of the fourth register such that an input terminal which is non-inverting on the third AND gate receives via the fourth register binary signals representing bit number 1 in words from the internal link. In addition, the third AND gate has a further input terminal which is non-inverting and is connected to the output terminal of the third bus selector.

The third AND gate G3 has an output terminal connected to one input terminal of a first bistable multivibrator FFA and the fourth AND gate has an output terminal connected to the second input terminal of this multivibrator, which further has a clock input connected to the time control unit PVCD for receiving a time allocation signal PN unique to the transmission means SIUN. The multivibrator FFA has two complementary output terminals and is arranged such that binary signals are generated at these terminals, with their value depending on the output signals from the third and fourth AND gates, and this value can only be altered at times determined by the time allocation signal PN.

One output terminal of the bistable multivibrator FFA is connected to an enabling input terminal on the second bus selector BS2, and also to an input terminal on a second multivibrator FFB. The latter also has a clock input connected to an output terminal for bit 19 on the time control unit. The output terminal of this multivibrator is connected to an enabling input terminal on the first bus selector BS1.

A third multivibrator FFC has an input terminal connected to the conductor in the data bus DB which is permanently assigned to the transmission means. This multivibrator FFC also has a clock input connected to receive bit clock pulses BCXL from the time control unit, and has its output terminal connected to two data inputs denoted 0 and 1 on a first data selector DS4.

A fourth multivibrator FFD has an input terminal connected to the conductor in the status bus OB, which is permanentaly assigned to the transmission means. In addition, this multivibrator has a clock input connected to receive word clock pulses WCXL from the time control unit, and its output terminal is connected to a control input denoted A2 on the first data selector DS4.

The first data selector DS4 has a control input AO connected to receive a signal B18 and a control input A1 connected to the output terminal of a first OR gate. This OR gate has in turn two input terminals connected to receive the signal B18 and a signal B17, respectively. The first data selector DS4 further has two data inputs denoted 2 and 3, each connected to complementary output terminals on the first multivibrator, these terminals providing information on the engaged/unoccupied status. In addition, the first data selector has four further data inputs denoted 4, 5, 6 and 7 connected to receive word clock signals WCXL from the time control unit PXCD, and an output terminal connected to an input terminal of a parity regeneration means PR. This means has in turn an output terminal connected to an input terminal 5 of the link connection unit LT of the transmission means.

The first data selector sends a binary signal with a value corresponding to the value of a signal on one of its data inputs 0–7, the appropriate input being determined by signals on the control inputs A0, A1, A2 of the selector. The output signal of the selector corresponds to the input signal on the data input which is indicated by the binary value of the signals on the control inputs A0–A2. For example, if the input signals on the control inputs A0 and A1 have the logic value 0 and the input signal on the control input A2 has the logic value 1, the selector selects as its output signal the input signal on the data input denoted 4. If instead the input signal on the control input A0 has the logic value 1 and the input signals on the control inputs A1 and A2 have the logic value 0, the selector selects as its output signal the input signal on the data input denoted 1.

Figure 5:
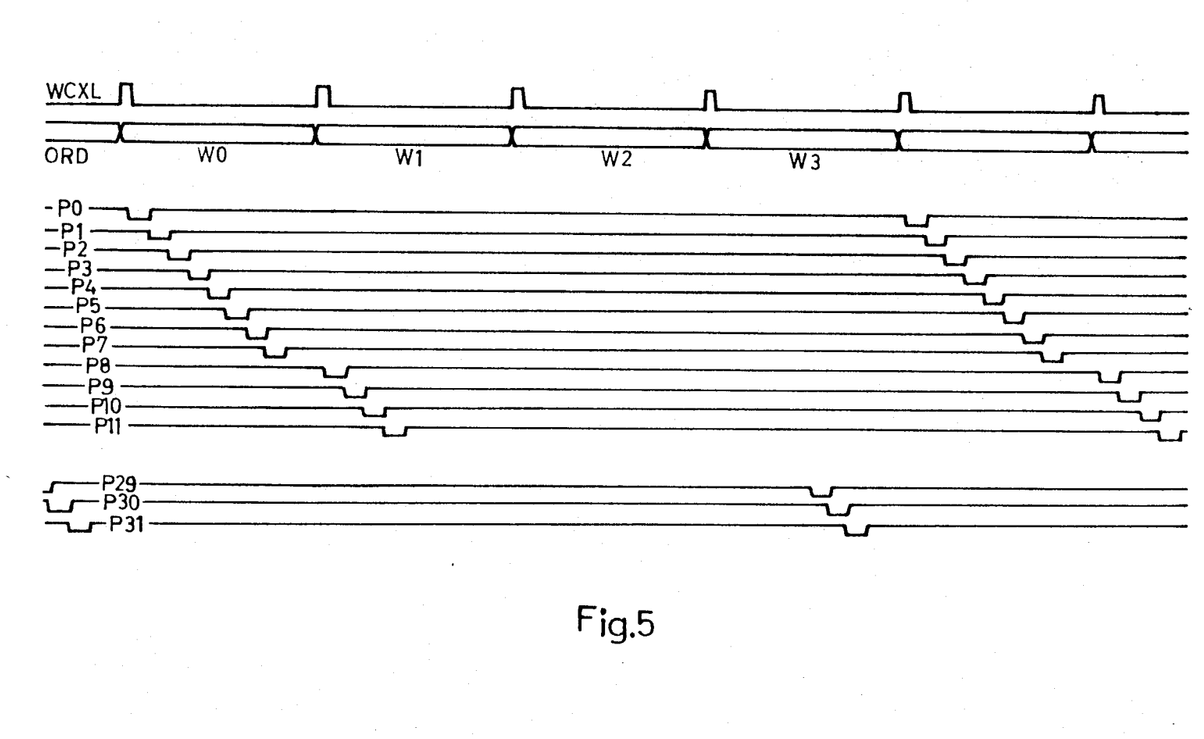
FIGS. 5 and 6 illustrate the relative time relationship between different signals and processes in a switching node according to the embodiment of FIGS. 2–4.

Timing relationships between the word synchronizing pulses WCXL and the different time allocation signals P0, P1, ... P31 from the time control unit PXCD to the different transmission mean are illustrated in FIG. 5. From this figure it can be seen that the time allocation signals P0–P31 occur in a cyclic order and that one cycle is as long as four 20 bit words on an internal link. Of the time allocation signals, P0–P7 occur during a first word W0, P8–P15 during a second word W1, P16–P23 during a third word W2 and P24–P31 during a fourth word W3. The signals P0, P8, P16 and P24 occur after the nearest word synchronizing pulse, while the signals P7, P5, and P31 occur before the next nearest word synchronizing pulse.

Figure 6:
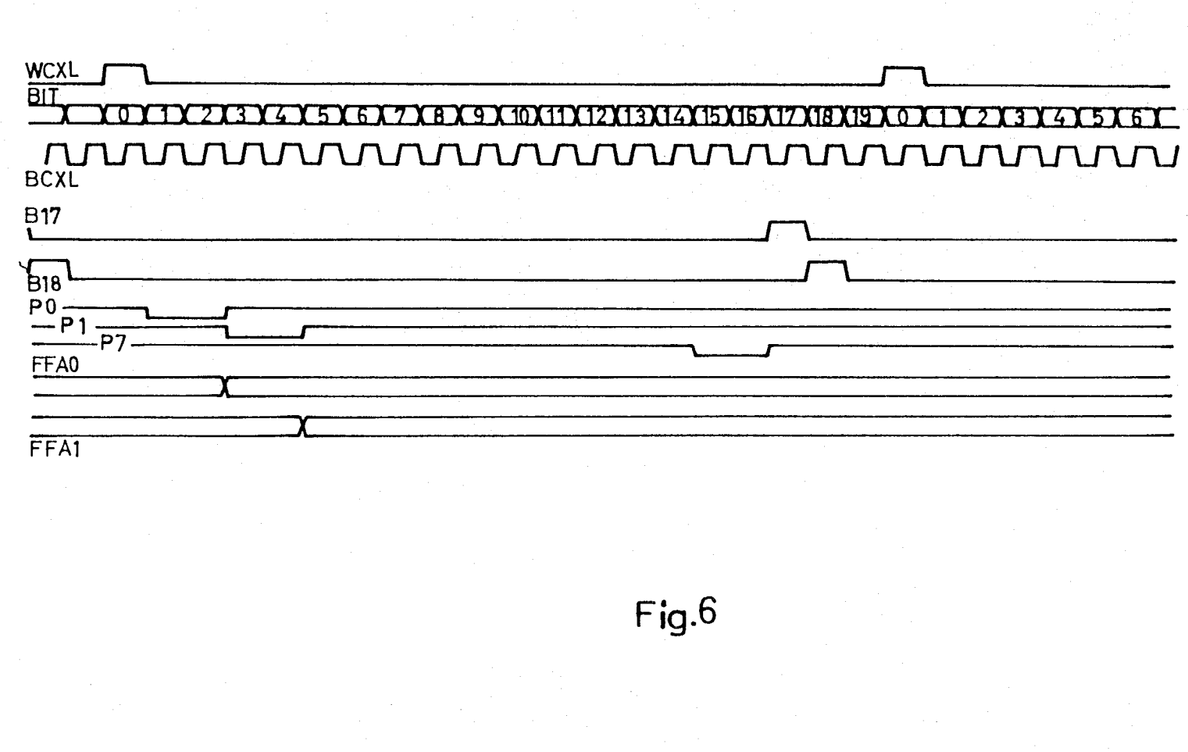

FIG. 6 illustrates the timing relationships between the word synchronizing pulses WCXL, the bit synchronizing pulses BCXL and the time allocation signals P0, P1 and P7 from the time control unit PXCD as well as the bits 0–19 in a word and the signals from the multivibrators FFA in the transmission means SIU0 and SIU1. From FIG. 6 it is apparent that the word synchronizing pulses WCXL occur during bit 0 in each word, that the time allocation signal P0 occurs during the bits 1 and 2, the time allocation signal P1 occurs during the bits 3 and 4, and the time allocation signal P7 occurs during the bits 15 and 16 in the same word. In addition, it will be seen from the figure that the complementary output signals from the first multivibrators FFA0 and FFA1 in the transmission means SIU0 and SIU1 may change logic level at the juncture between bit 2 and bit 3 and at the juncture between bit 4 and bit 5, i.e., at the end of the time allocation of the respective signal P0 or P1 of the respective transmission means.

The transmission means described with reference to FIGS. 4–6 functions in principle in the same way as that previously described in connection with FIGS. 1–3. Therefore, further description of its operation will be omitted.

In the embodiments described above, a plurality of channels in the bus system are created with the aid of a plurality of conductors. Furthermore, a plurality of data transmission channels on the bus system are each permanently assigned to a transmission means by a data bus having a unique conductor for each transmission means. Status transmission channels separate from the data transmission channels are created in the embodiment described here by a separate status bus with a conductor for each transmission means. It should be apparent to one skilled in the art, however, that these features can be achieved in other ways. For example, a bus system with a bus common to all channels instead of one with two separate buses could be used to create both a plurality of data transmission channels and plurality of status transmission channels. It is also conceivable to reduce the number of required conductors in the bus system with the aid of a multiplexing process while the fixed assignment of data and status transmission channels is maintained.

What is claimed is:

1. A method of transmitting message information between a plurality of transmission means by means of a bus system having a plurality of transmission channels, comprising the steps of:
   dividing the transmission channels into data transmission channels and status transmission channels;
   assigning each data transmission channel and each status transmission channel to a respective transmission means;
   transmitting message information from a first transmission means to a second transmission means only over the data transmission channel assigned to said second transmission means; and
   transmitting status information from said first transmission means to the other transmission means over the status transmission channel assigned to said second transmission means to indicate whether the data transmission channel assigned to said second transmission means is occupied.

2. The method as claimed in claim 1, wherein message information is transmitted on the data transmission channels from each transmission means to at most one other transmission means at a time.

3. The method as claimed in claim 1, wherein message information is transmitted on the data transmission channels to each transmission means from at most one transmission means at a time.

4. The method as claimed in claim 1, further including the steps of sensing status information on the status transmission channel assigned to a receiving transmission means prior to a desired transmission of message information from a transmitting means to a receiving transmission means, to determine whether the data transmission channel of the receiving transmission means is unoccupied or engaged as a result of the transmission from some other transmission means, and inhibiting a desired transmission of message information from the transmitting transmission means to the receiving transmission means as long as the sensed status information on the status transmission channel of the receiving transmission means indicates that the data transmission channel on the receiving transmission means is engaged as a result of the transmission from another transmission means.

5. The method as claimed in claim 1, wherein said message information comprises packet-switched communications, and wherein each transmission means for transmitting information on the bus system is supplied message information from at most one packet-switched communication, and each transmission means for receiving information on the bus system receives on its data transmission channel message information from at most one packet-switched communication at a time.

6. Apparatus for transmitting message information, comprising:
   a plurality of transmission means for transmitting and receiving information;

at least one bus system, having a plurality of data transmission channels each assigned to a respective one of the transmission means, each data transmission channel transmitting message information only to the transmission means to which it is assigned from a selectable one of the other transmission means; and a plurality of status transmission channels on the bus system which are each assigned to a respective one of the transmission means for transmitting status information from a selectable one of the transmission means to other transmission means to indicate whether the data transmission channel assigned to the same transmission means as the status transmission channel is engaged or unoccupied for transmitting message information.

7. The apparatus as claimed in claim 6, wherein each transmission means transmits message information on the data transmission channels to at most one other transmission means at a time.

8. The apparatus as claimed in claim 6, wherein each transmission means receives message information on the data transmission channels from at most one other transmission means at a time.

9. The apparatus as claimed in claim 6, wherein the data transmission channels are arranged on different conductors on a data bus, said bus including a unique conductor for each transmission means and the status transmission channels are arranged on different conductors in a status bus, said status bus including a unique conductor for each transmission means.

10. The apparatus as claimed in claim 6 for transmitting packet-switched message information on packet-switched communications, further including a plurality of link handling units each connected to a respective external link, said units being connected in groups via one of a plurality of distribution buses to one of a plurality of distribution units which are each connected via a respective internal link to a respective transmission means for transmitting and receiving information on at least one bus, said transmission means each including a link connection unit, a logic unit, a first bus selector, a second bus selector, a third bus selector and a bus selector control, said first bus selector being connected to a plurality of conductors in a data bus said second and third bus selectors being connected to a plurality of conductors in a status bus, said logic unit being connected to a conductor in the data bus which is assigned to a respective transmission means and unique to said transmission means, and a time control unit common to the transmission means for generating bit and control synchronizing signals for the transmission means and the internal links, and time allocation signals for the logic units (LU) of the transmission means.

11. A method of transmitting message information via a bus system comprising at least one bus and a plurality of communication means for sending and receiving information on the bus, said method comprising the steps of:

arranging a plurality of data channels and a plurality of status channels on the bus system;

assigning a unique data channel to each communication means and a unique status channel to each communication means;

transmitting message information from any communication means to a particular communication means on the data channel assigned to that particular communication means; and transmitting to any communication means on the status channel assigned to the particular communication means status information which indicates whether that particular communication means is engaged or unoccupied for the transmission of message information.

12. A method as claimed in claim 11, wherein status information indicating that a first communication means is engaged is transmitted on the status channel assigned to said first communication means from any communication means transmitting message information to said first communication means on the data channel assigned to said first communication means.

13. A method as claimed in claim 11, wherein message information is transmitted on the data channels from any one communication means to at most one other communication means at a time.

14. A method as claimed in claim 11, wherein message information is transmitted on the data channels to any communication means from at most one other communication means at a time.

15. A method as claimed in claim 11 for the transmission of message information on packet-switched connections, wherein each communication means for transmission on the bus system is supplied message information from at most one packet-switched connection at a time, and each communication means receives message information on its assigned data channel stemming from at most one packet-switched connection at a time.

16. A method as claimed in claim 11, wherein the status information is sensed on the status channel assigned to the receiving communication means before a desired transmission of message information from a transmitting communication means to a receiving communication means takes place on the bus system, to determine whether the data channel assigned to the receiving communication means is unoccupied or engaged as a result of the transmission from some other communication means, and a desired transmission of message information from the transmitting communication means to the receiving communication means does not take place on the bus system as long as the sensed status information on the status channel assigned to the receiving communication means indicates that the data channel assigned to the receiving communication means is engaged.

17. Apparatus for the transmission of message information, said apparatus comprising a bus system and a plurality of communication means connected to the bus system for transmitting and receiving information on the bus system, the bus system having a plurality of data channels and a plurality of status channels, a unique data channel being assigned to each one of the communication means for transfer of message information only to the communication means to which the data channel is assigned from a selectable one of the communication means, a unique status channel assigned to each one of the communication means for the transfer of status information from a selectable one of the communication means to other communication means, said status information on a given status channel indicating whether the data channel assigned to the same communication means as the status channel is engaged or unoccupied for transmitting message information.

18. Apparatus as claimed in claim 17, wherein each communication means is connected to the bus system for transmitting message information on the data channels to at most one other communication means at a time.

19. Apparatus as claimed in claim 17, wherein each communication means is connected to the bus system for receiving message information on the data channels from at most one other communication means at a time.

20. Apparatus as claimed in claim 17, wherein the bus system includes a data bus and a status bus, the data bus having a unique bus conductor assigned to each communication means, and the status bus having a unique bus conductor assigned to each communication means.

21. Apparatus as claimed in claim 20 for transmitting packet-switched message information on packet-switched connections, said apparatus further including:
- a plurality of internal links, each internal link being connected to a unique one of the communication means;
- a plurality of distribution units, each distribution unit being connected to a unique one of the internal links;
- a plurality of distribution buses, each distribution bus being connected to a unique one of the distribution units;
- a plurality of link handling units, each link handling unit being connected to one of the distribution buses, a plurality of link handling units being connected to the same distribution bus; and
- a plurality of external links, each external link being connected to one of the link handling units;

said communication means each including:
- a link connection unit connected to the internal link of the communication means;
- a logical unit connected to the bus conductor in the data bus assigned to the communication means;
- a first bus selector connected to every bus conductor in the data bus assigned to any one of the communication means;
- second and third bus selectors each connected to every bus conductor in the status bus assigned to any one of the communication means; and
- a bus selector controller connected to the logical unit and the first, second and third bus selectors for controlling the bus selectors in dependence upon the logical unit.

* * * * *